US007882284B2

(12) United States Patent
Wilson et al.

(10) Patent No.: US 7,882,284 B2
(45) Date of Patent: Feb. 1, 2011

(54) COMPUTE UNIT WITH AN INTERNAL BIT FIFO CIRCUIT

(75) Inventors: James Wilson, Foxboro, MA (US); Yosef Stein, Sharon, MA (US); Joshua A. Kablotsky, Carlisle, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 11/728,358

(22) Filed: Mar. 26, 2007

(65) Prior Publication Data

US 2008/0244237 A1 Oct. 2, 2008

(51) Int. Cl.
*G06F 3/00* (2006.01)
*G06F 5/00* (2006.01)
*G11C 7/10* (2006.01)
(52) U.S. Cl. ............ 710/52; 709/234; 365/189.05
(58) Field of Classification Search ............ 710/9, 710/52; 709/234; 365/189.05
See application file for complete search history.

(56) References Cited

U.S. PATENT DOCUMENTS

| | | | | |
|---|---|---|---|---|
| 5,287,511 A | * | 2/1994 | Robinson et al. | 717/106 |
| 5,351,047 A | * | 9/1994 | Behlen | 341/67 |
| 5,710,939 A | * | 1/1998 | Ballachino et al. | 710/1 |
| 5,819,102 A | * | 10/1998 | Reed et al. | 712/34 |
| 5,961,640 A | * | 10/1999 | Chambers et al. | 712/300 |
| 5,970,241 A | * | 10/1999 | Deao et al. | 712/227 |
| 6,009,499 A | * | 12/1999 | Koppala | 711/132 |
| 6,029,242 A | * | 2/2000 | Sidman | 712/42 |
| 6,061,749 A | | 5/2000 | Webb et al. | |
| 6,094,726 A | | 7/2000 | Gonion et al. | |
| 6,332,188 B1 | | 12/2001 | Garde et al. | |
| 2005/0086452 A1 | | 4/2005 | Ross | |

OTHER PUBLICATIONS

U.S. Appl. No. 11/258,801, filed Oct. 26, 2005, Wilson et al.
Preliminary Report on Patentability and Written Opinion, Application No. PCT/US2008002914, "Compute Unit With An Internal Bit Fifo Circuit", dated Oct. 8, 2009, 6 pages.

* cited by examiner

*Primary Examiner*—Alford W Kindred
*Assistant Examiner*—Farley J Abad
(74) *Attorney, Agent, or Firm*—Bingham McCutchen LLP

(57) ABSTRACT

A compute unit with an internal bit FIFO circuit includes at least one data register, a lookup table, a configuration register including FIFO base address, length and read/write mode fields for configuring a portion of the lookup table as a bit FIFO circuit and a read/write pointer register responsive to an instruction having a lookup table identification field, length of bits field and register extract/deposit field for selectively transferring in a single cycle between the FIFO circuit and the data register a bit field of specified length.

17 Claims, 10 Drawing Sheets

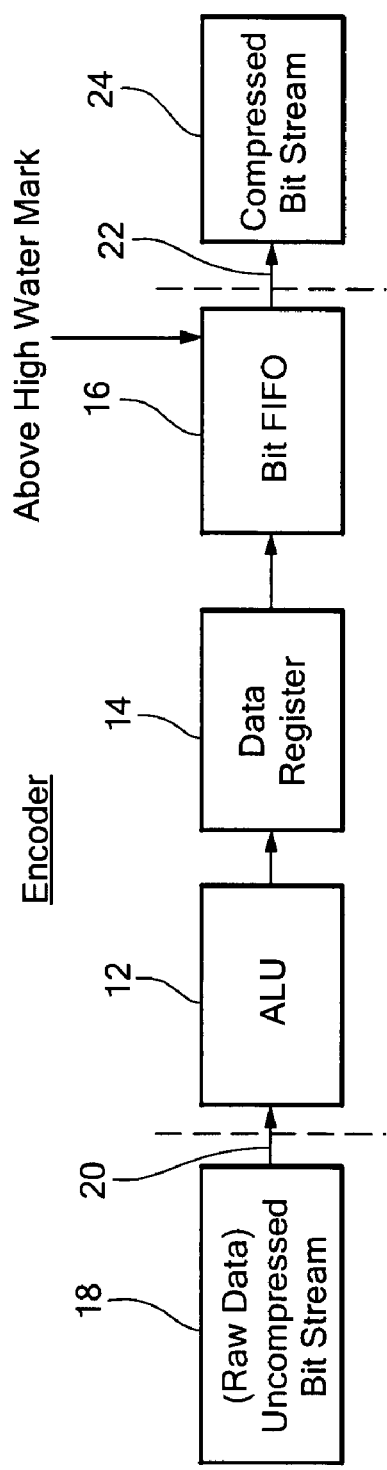
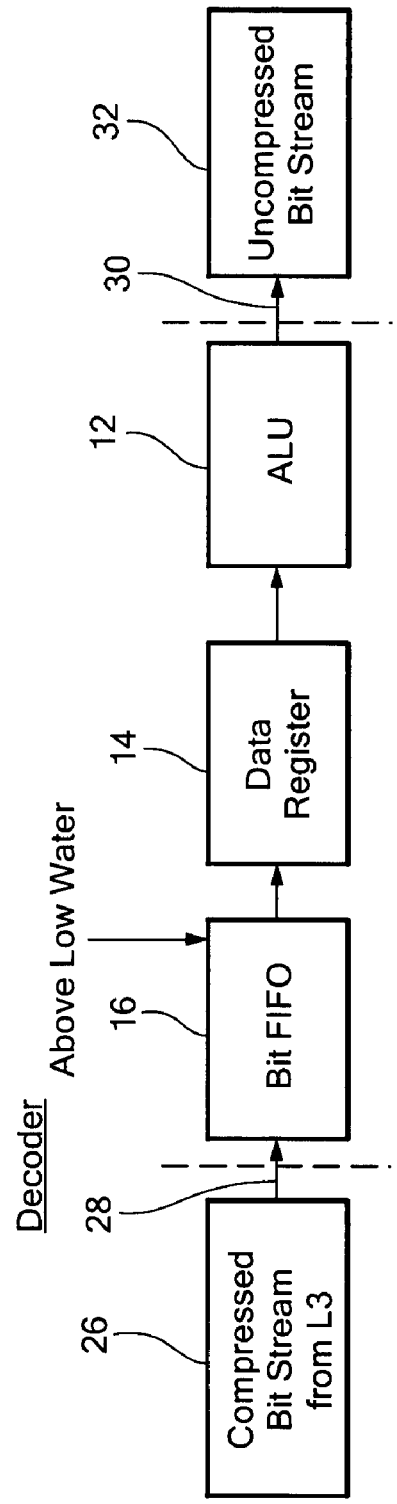
FIG. 3A
FIG. 3B

Read Instruction

Write Instruction

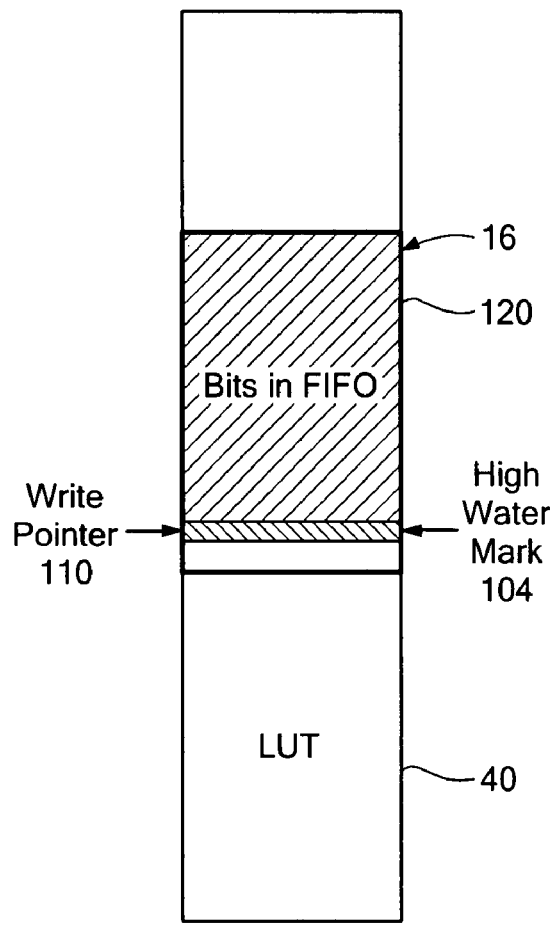 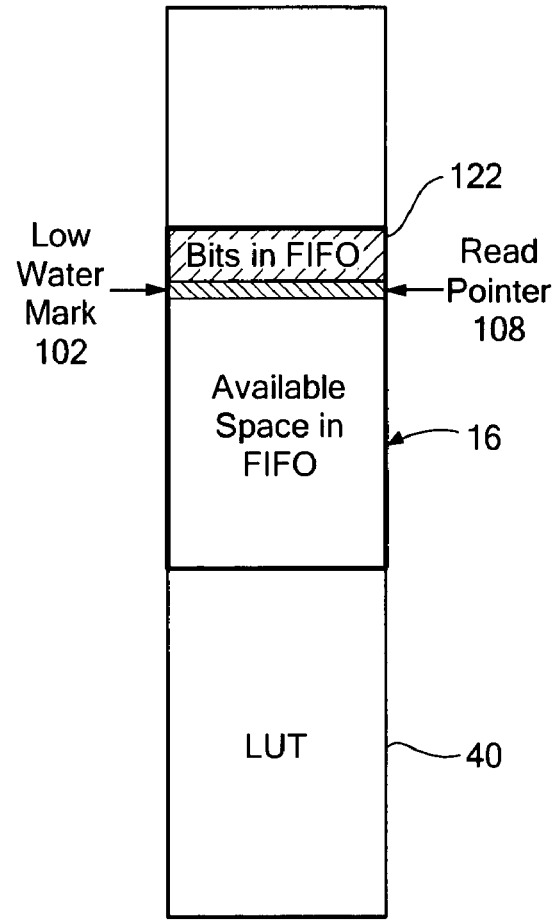
*FIG. 7A*  *FIG. 7B*

COMPUTE UNIT WITH AN INTERNAL BIT FIFO CIRCUIT

RELATED APPLICATIONS

This application is related to U.S. patent application Ser. No. 11/258,801, entitled IMPROVED PIPELINED DIGITAL SIGNAL PROCESSOR by Wilson et al. with a filing date of Oct. 26, 2005, incorporated by reference herein.

FIELD OF THE INVENTION

This invention relates to a compute unit with an internal bit FIFO circuit.

BACKGROUND OF THE INVENTION

A digital signal processor is a special purpose processor optimized for digital signal processing applications such as or digital filtering, speech analysis and synthesis or video encoding and decoding to produce compressed bit streams. Certain communication or video applications may use Huffman coding, which uses a Variable Length Coding scheme (as opposed to coding schemes that use a fixed number of bits per codeword). The Huffman coding minimizes the total number of bits for code-words appearing with the highest frequency. This coding selects the number of bits based on known probabilities so that a data bit-stream is decoded as the bits arrive in the data stream. This coding achieves a tighter packing of data since the most commonly occurring characters are short and the infrequently occurring characters are long, wherein the shortest character with the highest probability of occurrence is only one bit long. Most digital signal processors are designed to manipulate data having a fixed word size (e.g., 8-bit, 16-bit or 32-bit words). When the processor needs to manipulate a non-standard word sizes it is typically done using a bit FIFO circuit which can handle bit fields of any specified length. One shortcoming of such devices is that they are implemented in storage external to the compute unit so that whenever access is required to read or write a stall can occur. This is exacerbated by the fact that access to extend storage can only be had through the data address generator (DAG). Another problem with relying on an external bit FIFO circuit is that it increases the distance that the signals must travel and therefore limits the speed of operation cycles.

BRIEF SUMMARY OF THE INVENTION

It is therefore an object of this invention to provide an improved compute unit with an internal bit FIFO circuit.

It is a further object of this invention to provide such an improved compute unit with an internal bit FIFO circuit which utilizes a lookup table of the compute unit to implement the bit FIFO circuit.

It is a further object of this invention to provide such an improved compute unit with an internal bit FIFO circuit which can be conditionally filled and spilled from and to an external storage.

It is a further object of this invention to provide such an improved compute unit with an internal bit FIFO circuit which sets high and low water marks to define a window for continuous bit stream operand.

It is a further object of this invention to provide such an improved compute unit with an internal bit FIFO circuit which fills and spills with 32 bit memory aligned words.

It is a further object of this invention to provide such an improved compute unit with an internal bit FIFO circuit in which filling and spilling occurs conditioned on high and low water marks.

It is a further object of this invention to provide such an improved compute unit with an internal bit FIFO circuit which can transfer in one cycle a bit field of specified length in the form of a continuous bit stream between an external storage and any compute unit data register.

It is a further object of this invention to provide such an improved compute unit with an internal bit FIFO circuit which may utilize only a part of a lookup table and there may be more than one bit FIFO circuit in one or more lookup tables.

It is a further object of this invention to provide such an improved compute unit with an internal bit FIFO circuit which can deposit/extract data from left to right (Big Endian) or right to left (Little Endian).

The invention results from the realization that a bit FIFO can be internally provided within a compute unit by configuring a lookup table in the compute unit to define a bit FIFO base address, length and read/write mode and using a read/write pointer register responsive to an instruction having a lookup table identification field, length of bits field and register extract/deposit field for selectively transferring in a single cycle between said FIFO circuit and said data register a bit field of specified length.

The subject invention, however, in other embodiments, need not achieve all these objectives and the claims hereof should not be limited to structures or methods capable of achieving these objectives.

This invention features a compute unit with an internal bit FIFO circuit including at least one data register, a lookup table, a configuration register including FIFO base address, length and read/write mode fields for configuring a portion of the lookup table as a bit FIFO circuit and a read/write pointer register responsive to an instruction having a lookup table identification field, length of bits field and register extract/deposit field for selectively transferring in a single cycle between the FIFO circuit and the data register a bit field of specified length.

In a preferred embodiment the configuration register may further include a little/big endian mode field. The transferring of a bit field may include extracting a bit field from the FIFO circuit and storing it in the compute unit data register in response to information in the configuration and pointer registers and the instruction. The transferring of a bit field may include depositing a bit field from a data register into the bit FIFO circuit and in response to information in the configuration and pointer registers and the instruction. The extracting may include updating the read pointer in the read/write pointer register by the specified length in the modulo FIFO length. The depositing may include updating the write pointer in the read/write pointer register by the specified length in the modulo FIFO length. The read/write pointer register may include a word address field and bit position field for tracking the specified length. It may further include a water mark register for defining the high water mark above which transfers to the bit FIFO circuit are prohibited and the bit FIFO circuit must be spilled to an external storage and the low water mark below which transfer from the bit FIFO circuit is permitted for enabling the bit FIFO circuit to be filled from the external storage with a continuous bit stream operand. The filling and spilling with the external memory may occur with 32 bit words. The 32 bit words may be memory aligned. The lookup table may include a random access memory. The data register may be one of the compute unit register files. Extracting may include updating the read pointer in the read pointer register and generating a low watermark signal if the bits left in the FIFO are below the low water mark. Depositing may include updating the write pointer in the write pointer register and generating a high watermark signal if the bits in the FIFO are above the high water mark. The lookup table may include multiple bit FIFOs.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIGS. 3A and B are simplified schematic block diagrams of encoding and decoding systems respectively, according to this invention;

FIGS. 7A and 7B show the efficacy of the use of the high water and low water marks, respectively.

DETAILED DESCRIPTION OF THE INVENTION

Figure 1:
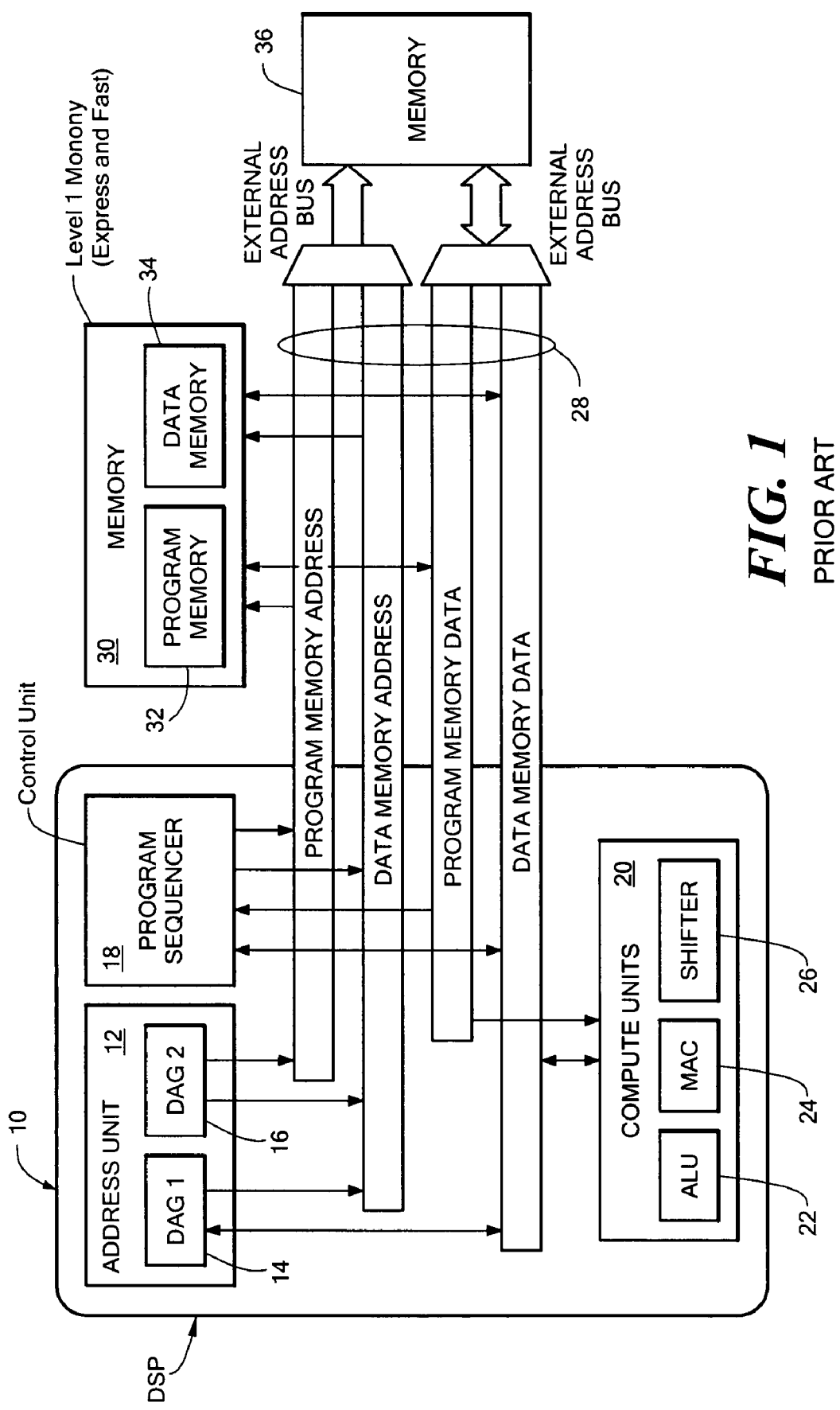
FIG. 1 is a simplified block diagram of a prior art digital signal processor (DSP) with external memories and memory buses.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 a digital signal processor 10 including an address unit 12 having one or more digital address generators 14, 16, a control unit, such as program sequencer 18 and one or more compute units 20, each of which contains a number of circuits such as arithmetic logic unit 22, multiply/accumulator 24, shifter 26. Typically there are two, four or many more compute units in a digital signal processor. The digital signal processor is connected over memory buses 28 to one or more memories such as level one (L1) memory 30, including program memory 32 and data memory 34 or additional memory 36. Memory 30 may be a level one memory which is typically very fast and quite expensive. Memory 36 may be a level three (L3) memory which is less expensive and slower. With DSP 10 operating at 1 GHz and beyond, the cycles of operations are so fast that the address unit and the compute units require more than one cycle to complete their operations. To improve DSP 10 throughput and enhance its performance, it is typically deeply pipelined.

In pipelined operations, when there is no dependency between the result of a previous instruction and the subsequent one across all processor parallel building blocks the pipeline efficiencies are preserved. However, if there is such a dependency a pipeline stall can happen, where the pipeline will stop and wait for the offending instruction to finish before resuming work. For example, if a computed result cannot be directly stored but must be used to generate an address where the related function of that computed result can be found in memory, there is a dependency between the compute unit result and the DAG which breaks the smooth operation of the pipeline, an example will suffice to illustrate.

Figure 2:
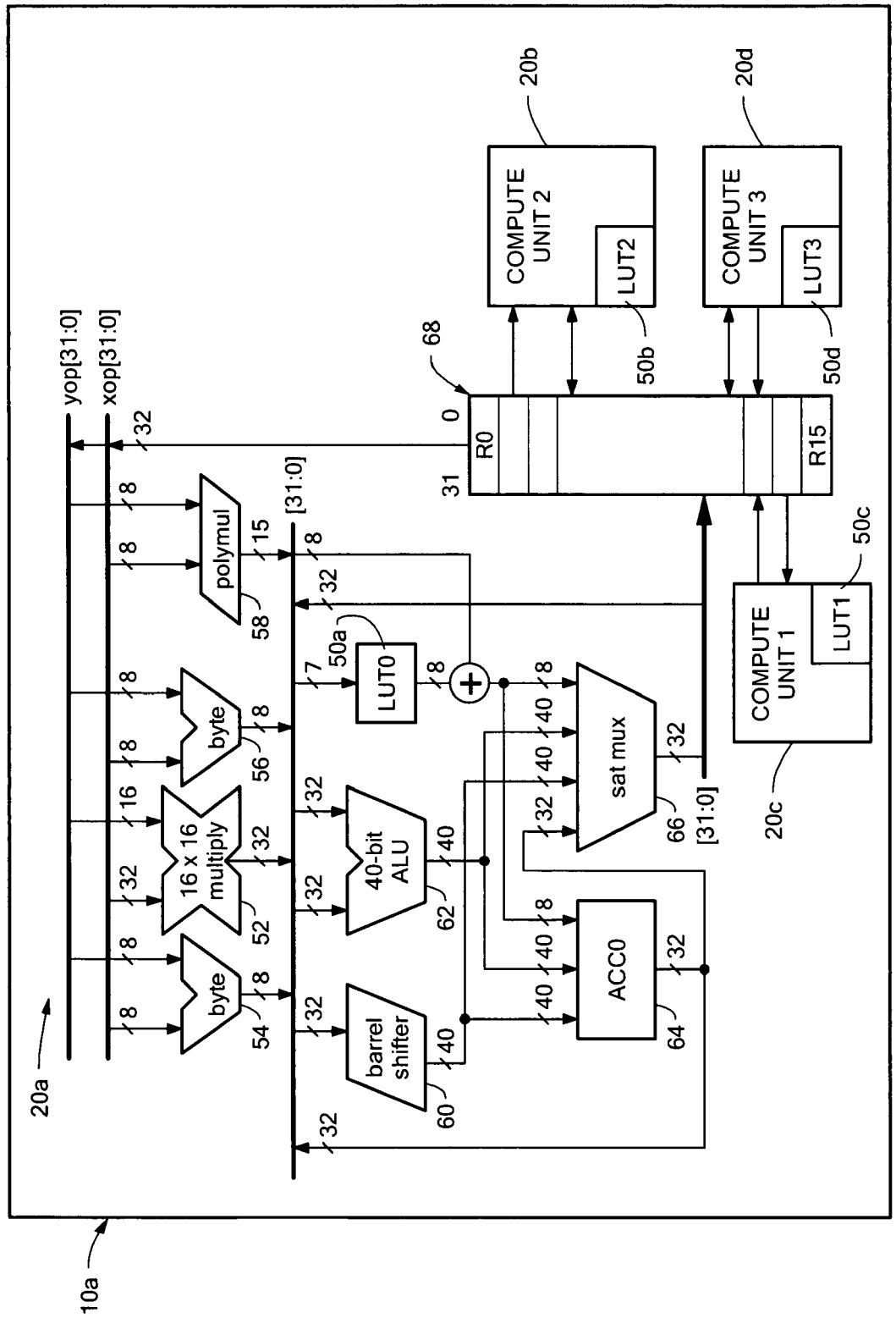
FIG. 2 is a block diagram of a digital signal processor with multiple compute units having local reconfigurable lookup tables according to this invention.

Suppose a compute unit computes a result which is an angle $\alpha$, but it is a function of that angle, sine $\alpha$, that is to be used in the execution of the subsequent operation. Then the compute unit must deliver the computed result to address unit 12 where DAG 14 or 16 generates the proper address to fetch from memory 30 or 36 the sine function of that angle and bring it back and submit it to the compute unit. This stall or break in the pipeline wastes time. One feature of DSP 10 is that address unit 12 and only address unit 12 can address memories 30 and 36. Thus any time a compute unit needs information from L1 memory 30 or L3 memory 36 to operate, the pipelining operations become stalled due to the fact that the compute unit result is valid at a stage later than when the DAG 12 register is loaded In accordance with this invention in DSP 10a according to this invention, each compute unit 20a, 20b, 20c, 20d, FIG. 2, is provided with a local reconfigurable fill and spill random access memory array, for example, lookup table (LUT) 50a. Compute unit 28 typically may include multiplier 52, a number of select circuits 54 and 56, a polynomial multiplier 58, such as for Galois field operations, barrel shifter 60, arithmetic logic unit 62, accumulator 64, and mux 66 among other things. Also, each compute unit includes a register file 68. The data register may be one of the compute unit register file. Typically when there is more than one compute unit, for example, as in FIG. 3, compute units 20a, 20b, 20c and 20d, they may all share the same register file 68. Each compute unit also has its own local reconfigurable fill and spill random access memory array, LUT 50a, 50b, 50c, and 50d. These local reconfigurable fill and spill random access memory arrays are small enough to fit in conventional compute units and to be accessible in one cycle, yet they are large enough to support most applications internally of the compute unit without having to go to external memory and bringing about pipeline stall.

The compute unit with the internally configured bit FIFO circuit, using for example an internal compute unit lookup table, is applicable to both encode and decode operations. In an encode operation compute unit 10, FIG. 3A includes an arithmetic logic unit 12, one or more data registers 14, and a bit FIFO 16 along with the other normally present components in a compute unit. In operation the raw data or uncompressed bit stream 18 is supplied on line 20 to arithmetic logic unit 12 which compresses the data in accordance with some algorithm for example H.264, windows media, MP3, or the like. The compressed data typically is delivered in an operand block, such as a macroblock, to data register 14. Data register 14 then delivers this to bit FIFO 16 which provides the continuous bit stream operand, such as a video macroblock, on line 22 as a compressed bit stream 24.

In addition to providing an internally configured bit FIFO 16 within compute unit 10, this invention has the added feature of providing a high water mark function in bit FIFO 16. During an encoding operation if the number of bits in bit FIFO 16 goes above the high water mark this is an indication that there is not enough space in the bit FIFO to deposit enough bits for encoding a complete operand, e.g. a complete macroblock and so some of the bits in the bit FIFO 16 must be spilled to an external storage, typically a class L3 storage.

When compute unit 10, FIG. 3B is operating in a decode operation a compressed bit stream 26, such as from a class L3 storage device is delivered on line 28 to bit FIFO 16. These bits are delivered via data register 14 to arithmetic logic unit 12 which decodes the data, typically, in video applications, in operands of macroblocks. The uncompressed or decoded data on line 30 is then provided as uncompressed data 32.

An added feature of this invention is the low water mark operation in bit FIFO 16. The low water mark establishes the limit below which decoding of the operand, for example, a video macroblock, cannot be efficiently accomplished and the bit FIFO must be filled form an external storage. When the number of bits in the FIFO 16 is above the low water mark then it is established that there are at least a minimum number of bits in the bit FIFO 16 to enable a macroblock or other defined operand to be decoded without a stall occurring in the processing.

Figure 4:
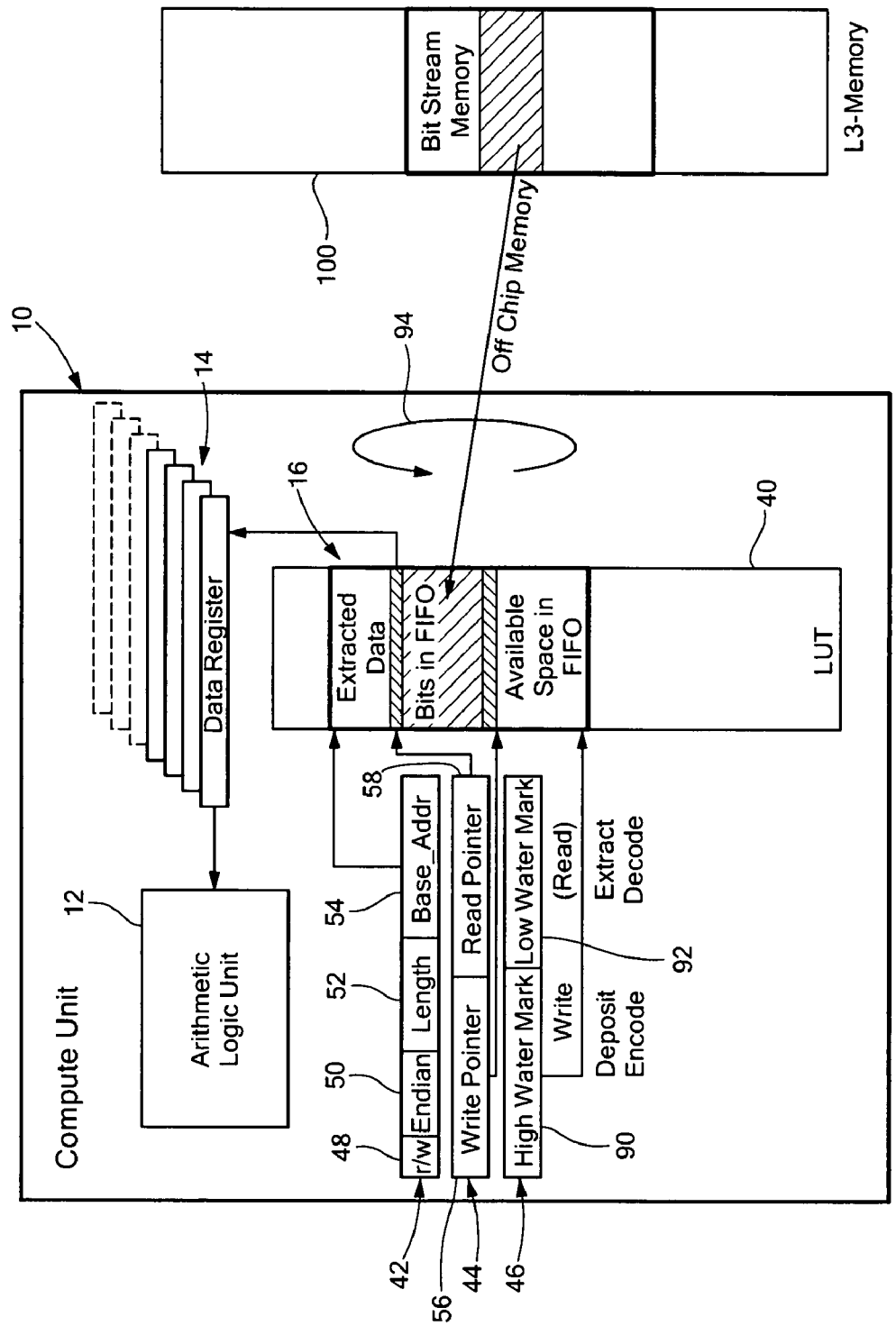
FIG. 4 is a schematic diagram of the internal bit FIFO implemented in a lookup table in a compute unit according to this invention.
Figure 5A:
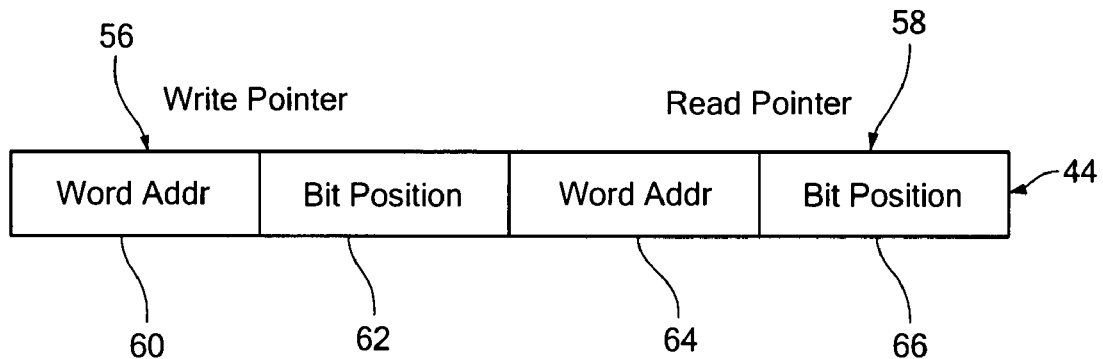
FIGS. 5A, 5B and 5C show field allocations of the pointer register, the read instruction and write instruction, respectively.
Figure 5B:
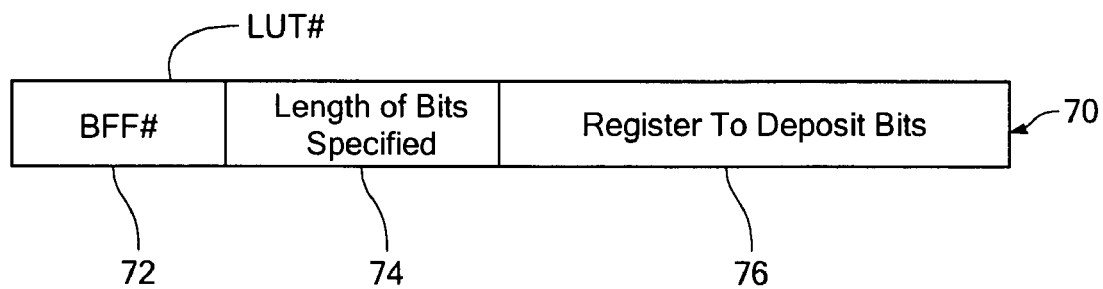
Figure 5C:
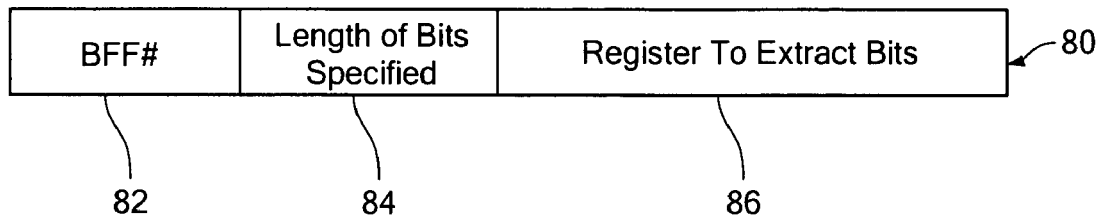

Bit FIFO 16, FIG. 4, is configured in lookup table 40, which may be a lookup table such as LUT 0, 50a, LUT 1, 50c, LUT 2, 50b, LUT 3, 50d, FIG. 2, which is included internally in compute unit 10. In addition to arithmetic unit 12 and one or more data registers 14, compute unit 10 also includes a bit FIFO configuration register 42, read/write pointer register 44 and water mark register 46. Configuration register 42 actually configures bit FIFO 16 in lookup table 40. It has a read/write field 48 which indicates whether bit FIFO 16 is being read from or written to and an endian field 50 which indicates whether bit FIFO 16 is being operated big endian, that is being read right to left with the most significant bit first or little endian, that is being read left to right with the least significant bit first. It also has a field 52 for defining the length of bit FIFO 16 in lookup table 40 and the beginning or base address 54 for defining the beginning address of bit FIFO 16 in lookup table 40. Pointer register 44 includes a write pointer 56 and a read pointer 58. Write pointer 56, FIG. 5A, includes a word address 60, and bit position 62. Read pointer 58 also includes a word address field 64 and bit position field 66. In each case, the word address indicates the address of the place in bit FIFO 16 which is to be written to or read from, respectively, while the bit positions indicate the number of bits at that address that have been specified by the read and write instructions, FIGS. 5B and C, respectively. The read instruction 70, FIG. 5B includes a bit FIFO identification field 72 which identifies the particular lookup table in which the bit FIFO has been configured; the length of bits specified to be read are indicated in field 74, while the register in which the specified number of bits are to be deposited is indicated in field 76. Write instruction 80, FIG. 5C, also has a field 82 which identifies the lookup table in which the bit FIFO to be written to has been configured, a field 84 in which the length of bits to be written is specified and a field 86 which identifies the register to which the extracted bits are to be delivered.

Returning to FIG. 4, the water mark register 46 includes a high water mark field 90 and low water mark field 92. The high water mark field is of interest during an encode operation when a deposit or writing of bits is occurring. The low water mark is of interest during a decode operation when an extraction or reading of bits from the bit FIFO is taking place. Pointer register 44 responds to a read or write instruction for selectively transferring in a single cycle either from the bit FIFO circuit to the data register or from the data register to the bit FIFO circuit. The transferring of the specified bit field can mean extracting a bit field from the FIFO circuit and storing it in the compute unit data register or depositing a bit field from the data register into the bit FIFO circuit. The extracting or depositing action includes updating the read or write pointer, respectively, in the read or write pointer register by the specified length in the modulo FIFO length in order to properly track the status of bit FIFO 16, which is a circular memory. That is, assuming for example it is a 512 bit memory, when the bit overflows 512, it circles around to zero and begins again as represented by arrow 94. The word address and bit positions in the pointer register, FIG. 5A, keep track of the data in bit FIFO 16.

During an encode operation, water mark register 46 utilizes the high water mark field 90 to signal that the FIFO is almost full and space must be made available by spilling or offloading bits from the bit FIFO 16 to off chip memory 100 such as class L3 otherwise a data overrun will occur In a decode operation, the low water mark field signals that there is not enough data in the FIFO to process the next macro-block and that the FIFO must be filled from off chip bit steam memory 100, otherwise a data under-run will occur. The low water mark is set at the minimum of number of bits to ensure that there are sufficient bits to allow a complete operand, for example, a video macroblock, to be processed without a stall occurring because of a lack of sufficient data.

Figure 6:
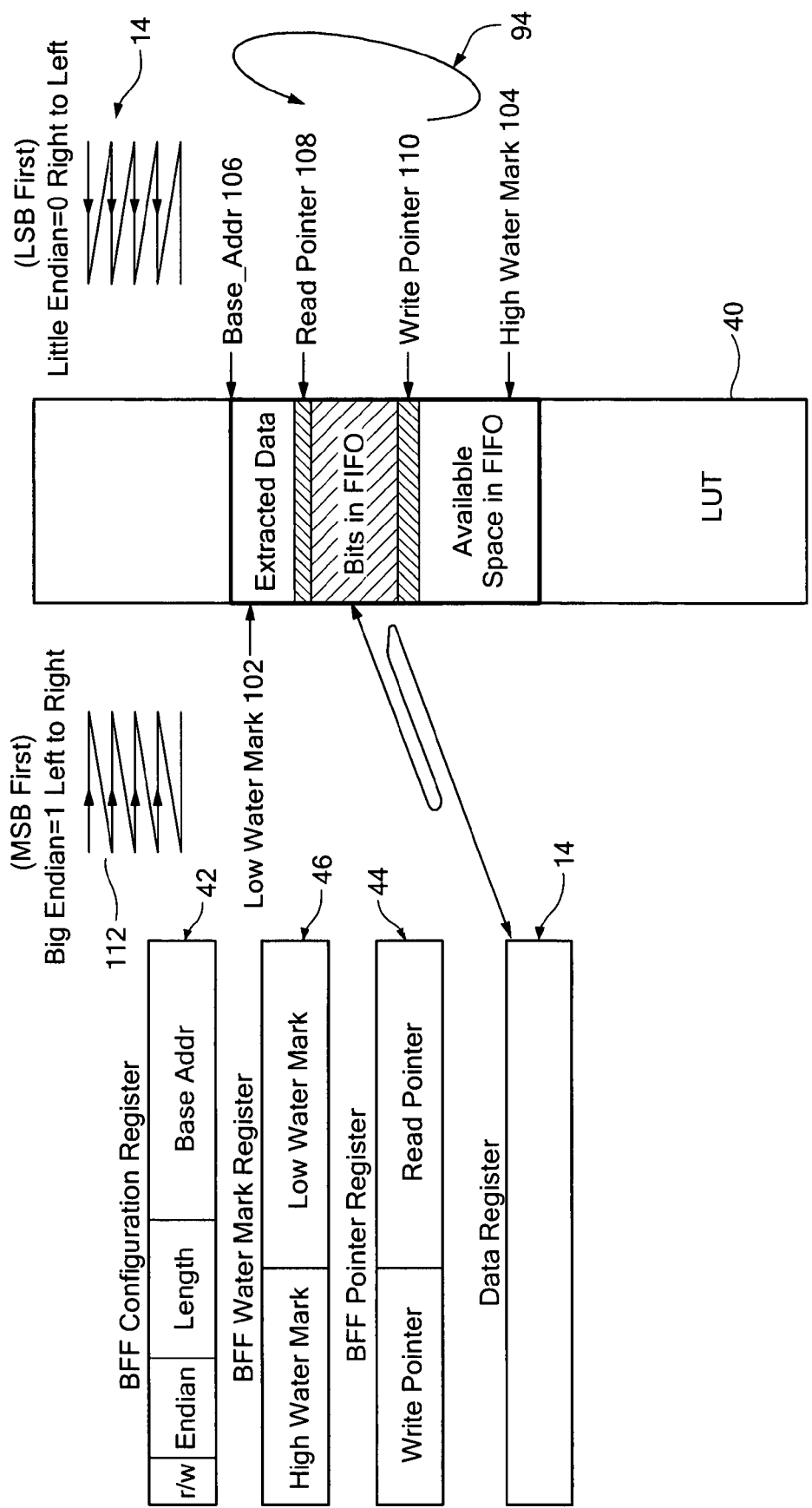
FIG. 6 is a view similar to FIG. 4 illustrating the use of low and high water mark features according to this invention with big endian and little endian options.

A graphic representation of the low water mark 102 and high water mark 104 is shown in FIG. 6, where lookup table 40 is filled from top to bottom. Also shown are the positions of the base address 106 and the read and write pointers 108 and 110, respectively. Also shown in FIG. 6 are the paths for big endian: MSB first, right to left 112, and little endian: LSB first, left to right 114. The filling and spilling to external memory 100, preferably occurs with standard words such as 32 bit words and typically the words are memory aligned, that is they are manipulated in bits (eight bits), short words (16 bits), words (32 bits), or double words (64 bits). Lookup table 40 may be implemented with a conventional random access memory device.

The operation of the high and low water marks can better be understood with reference to FIGS. 7A and B. In FIG. 7A there are a large number of bits 120 in bit FIFO 16 where write pointer 110 is closely approaching high water mark 104 at which point the FIFO must be spilled to avoid data over run. In FIG. 7B, there are only a few bits 122 in bit FIFO 16 and read pointer 108 has just barely reached the low water mark which confirms that there are enough bits 122 in bit FIFO 16 and the FIFO must be filled for fully processing an operand, e.g. a video macroblock of data without stall or data under run.

Figure 8:
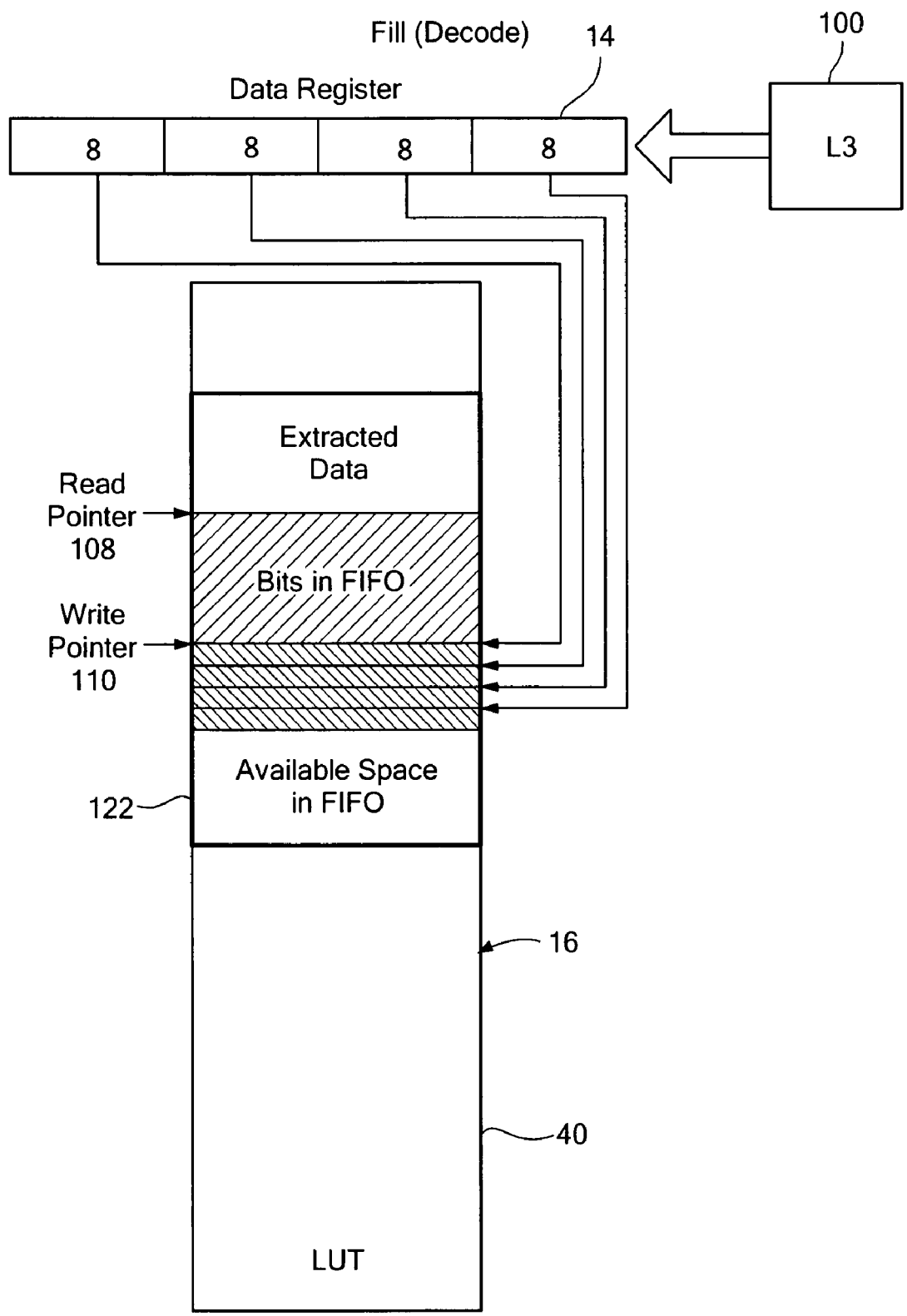
FIGS. 8 and 9 show fill and spill operations, respectively, between the lookup table implemented bit FIFO and external storage.
Figure 9:
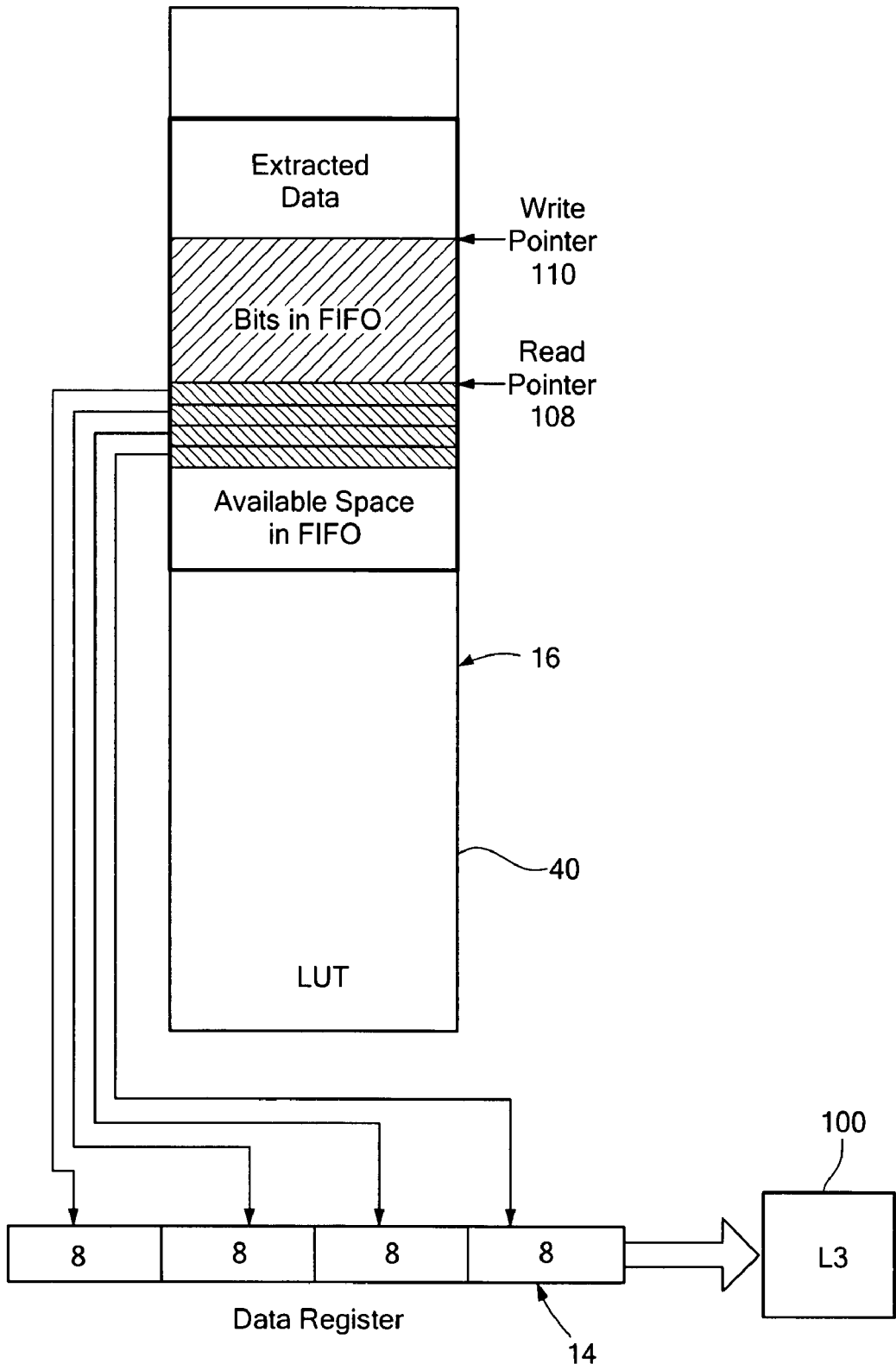
Figure 10:
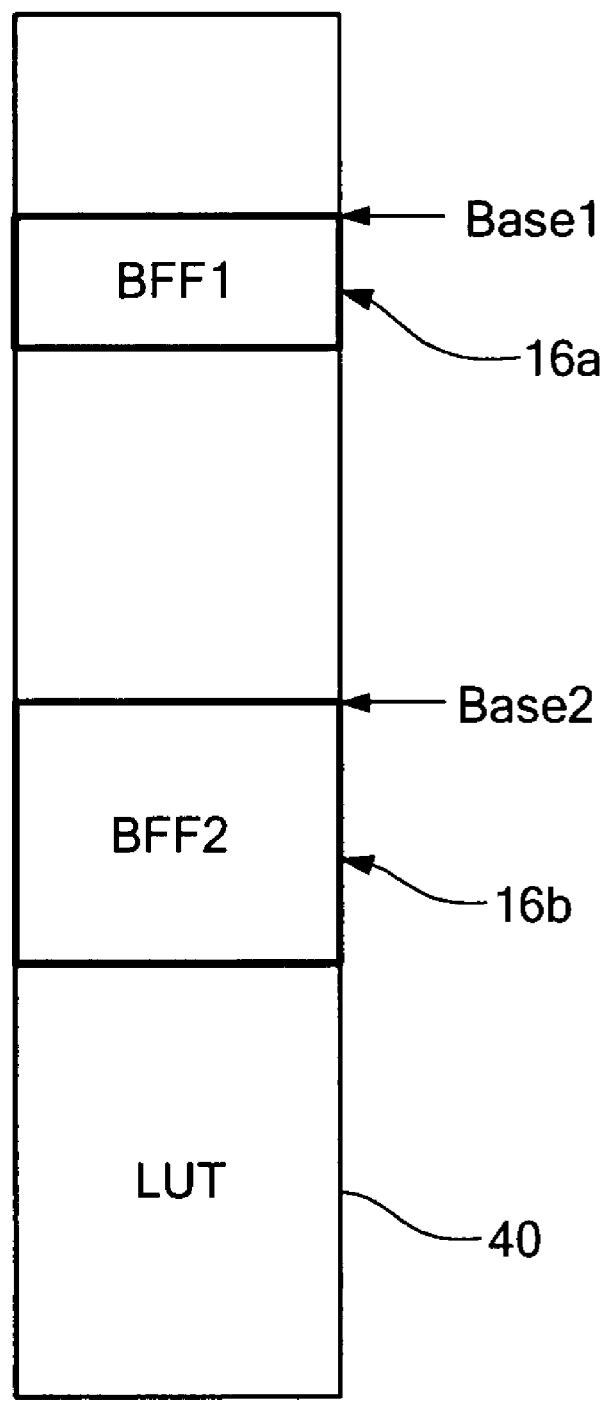
FIG. 10 illustrates implementation of more than one bit FIFO in a lookup table.

The fill and spill operations from and to respectively, off chip class L3 memory 100, is depicted in FIGS. 8, and 9, respectively. In a fill operation, FIG. 8, bit FIFO 16 is filled from off chip class L3 memory 100 via data register 14 which accepts four 8 bit bites or one 32 bit word and delivers them to bit FIFO 16 at write pointer 110 in the available space indicated at 122. A spill operation from bit FIFO 16 to off chip memory 100 occurs in FIG. 9, when data above read pointer 108 is delivered to data register 14 for forwarding to off chip memory 100. Although thus far the invention has been explained with reference to a single bit FIFO in a single lookup table in a single compute unit, a compute unit may have more than one so configured bit FIFOs; in fact there may be more than one bit FIFOs 16a, 16b, FIG. 10 in a single lookup table 40.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A compute unit with an internal bit First In First Out (FIFO) circuit, the compute unit comprising:
   an arithmetic logic unit;
   a local memory array comprising a lookup table addressable only within the compute unit;
   a configuration register including a FIFO base address field, a length field, and a read/write mode field for configuring a portion of said lookup table as a bit FIFO circuit providing a bit stream having an arbitrary number of bits; and
   a read/write pointer register responsive to an instruction having a lookup table identification field, a length of bits field, and a register extract/deposit field for selectively transferring in a single cycle between said bit FIFO circuit and a data register a bit field having a length specified in the length of bits field,
   wherein the arithmetic logic unit, the lookup table, the configuration register, and the read/write pointer register intercommunicate directly rather than over a system bus.

2. The compute unit of claim 1 in which said configuration register further includes a little/big endian mode field.

3. The compute unit of claim 1 in which the configuration and pointer registers and the instruction are collectively configured such that transferring a bit field includes extracting a bit field from said bit FIFO circuit and storing it in the data register.

4. The compute unit of claim 1 in which the configuration and pointer registers and the instruction are collectively configured such that transferring a bit field includes depositing a bit field from the data register into the bit FIFO circuit.

5. The compute unit of claim 1 in which said read/write pointer register includes a word address field and bit position field for tracking said specified length.

6. The compute unit of claim 1 further including a water mark register for defining a high water mark above which the bit FIFO circuit is spilled to an external storage and a low water mark below which the bit FIFO circuit is filled from the external storage with continuous bit stream operand.

7. The compute unit of claim 6 in which filling and spilling with an external memory occurs with 32 bit words.

8. The compute unit of claim 7 in which said 32 bit words are memory aligned.

9. The compute unit of claim 1 in which said memory array comprises a random access memory.

10. The compute unit of claim 1 in which said data register is configured in the compute unit.

11. The compute unit of claim 1 in which said lookup table includes multiple bit FIFOs.

12. The compute unit of claim 1 in which said data register is configured outside the compute unit.

13. The compute unit of claim 1 wherein the arithmetic logic unit, the lookup table, the configuration register, and the read/write pointer register intercommunicate directly via the data register.

14. A digital signal processor comprising:
    at least one data register; and
    a plurality of compute units each comprising a plurality of elements communicating directly, rather than over a system bus, with each other and with the at least one data register, the elements including
      an arithmetic logic unit;
      a memory array comprising a lookup table addressable only within the compute unit;
      a configuration register including a FIFO base address field, a length field, and a read/write mode field for configuring a portion of said lookup table as a bit FIFO circuit providing a bit stream having an arbitrary number of bits; and
      a read/write pointer register responsive to an instruction having a lookup table identification field, a length of bits field, and a register extract/deposit field for selectively transferring in a single cycle between said bit FIFO circuit and the at least one data register a bit field having a length specified in the length of bits field.

15. The digital signal processor of claim 14 wherein, for the plurality of compute units, the configuration and pointer registers and the instruction are collectively configured such that transferring a bit field includes extracting a bit field from the bit FIFO circuit of the compute unit and storing it in the at least one data register.

16. The digital signal processor of claim 14 wherein the plurality of compute units comprises multiple compute units sharing one data register.

17. The digital signal processor of claim 14 wherein the processor comprises a separate data register for each of the plurality of compute units.

* * * * *